Oct. 22, 1968        G. L. ANDERSON        3,406,451

GOTHIC ARCH BISECTOR AND RELATOR

Filed April 19, 1966        2 Sheets-Sheet 1

INVENTOR
GUS L. ANDERSON

BY
ATTORNEY

Oct. 22, 1968  G. L. ANDERSON  3,406,451
GOTHIC ARCH BISECTOR AND RELATOR
Filed April 19, 1966  2 Sheets-Sheet 2

INVENTOR
GUS L. ANDERSON
BY
ATTORNEY

United States Patent Office 3,406,451
Patented Oct. 22, 1968

3,406,451
GOTHIC ARCH BISECTOR AND RELATOR
Gus L. Anderson, York, Pa., assignor to The Dentists' Supply Company of New York, York, Pa., a corporation of New York
Filed Apr. 19, 1966, Ser. No. 543,744
9 Claims. (Cl. 32—32)

This invention relates to a fixture for use in prosthetic or restorative dentistry. More particularly, the fixture is designed for use with a dental articulator such as used by dentists and dental laboratories alike in conjunction with the construction and fabrication of artificial dentures.

The following is a description of the functions of a dental articulator and also of the manner in which the fixture comprising the present invention functions in regard thereto, the following is set forth.

In preparing for the fabrication of artificial dentures, an impression is first taken of a patient's alveolar ridges (gums). With the aid of such impressions, full upper and lower casts are first made from gypsum-type material, referred to as dental "stone" in the dental profession, of those areas within the oral cavity to which the intra-oral restoration device is to be applied. Normally, these areas comprise either portions or all of the upper or lower alveolar ridges of a patient, or both.

Models or patterns of the restorative appliance to be fabricated than are made from wax-like materials upon such casts and artificial teeth are applied to the wax material to simulate the ultimate restorative appliance. In accordance with the so-called "lost wax" procedure, the wax model or pattern thus made, with the teeth attached, is invested in a fluid mixture of said dental "stone" by a procedure which forms a mold of at least two separable parts. After hardening, the mold parts are separated to permit removal of the wax by the application of boiling water and other appropriate treatment. This forms a molding cavity comprising an exact complement of the restorative appliance which is to be formed therefrom.

Suitable denture base material in plastic condition, usually of a synthetic resin nature, is packed within said cavity and upon placing the parts of the mold in operative relationship and subjecting the same to heat and pressure, the synthetic resin is shaped and cured, as well as being united to the artificial teeth held by one of the mold parts, to form the desired restorative appliance. The mold is destroyed to remove the restorative appliance therefrom and the latter then is polished to complete it.

Regardless of whether an appliance is being made for the upper or lower alveolar ridges, for example, it is necessary to place any artificial teeth upon the restorative appliance in such manner that they will interdigitate with the teeth with which they are to cooperate in chewing or masticating operations. To accomplish this, proper placing of artificial teeth on the cast made in accordance with the above-described procedure is facilitated by the use of an articulator.

Basically, an articulator comprises two members, known as upper and lower bows, which are relatively movable with respect to each other. The lower bow simulates the lower mandible (jaw) of a human and the upper bow simulates the upper maxilla (jaw) thereof. Although, in nature, the lower mandible moves relative to the upper maxilla, it is only necessary to establish relative movement between said two bow members of the articulator to simulate the same relative movement between the human upper and lower maxilla and mandible. Thus, for convenience, articulators normally are designed so that the upper bow member moves relative to the lower bow member.

The casts or models made of a patient's alveolar ridges are affixed by certain procedures with respect to the upper and lower bow members of an articulator. Thus, when the model of a restorative appliance is being prepared and especially when the artificial teeth are being attached thereto in operative relationship therewith for coaction with the teeth of a cooperating denture or the natural teeth of the patient, actual simulated relative movemens between the upper and lower alveolar ridges of the patient can be imitated by the articulator by suitably adjusting certain elements on the articulator to cause the movements thereof to correspond to those of a specific patient.

When it is considered that the alveolar ridges of no two patients are exactly alike, and particularly where one patient might have large ridges while another patient might have very small ridges, the actual relative movements between the ridges of any two patients, obviously, will vary. Hence, it is necessary to simulate the actual movement of a specific patient as closely as possible when using an articulator to prepare a restorative appliance for that patient. Therefore, one of the primary problems involved in restorative dentistry is locating the casts of a patient's alveolar ridges at the proper location upon the bow members of a dental articulator so as to simulate as closely as possible the actual relative movement between the upper and lower ridges of that particular patient when the casts of the patient's ridges are connected to the bow members of the articulator.

To facilitate such accurate placement of the casts of the ridges of a specific patient in an articulator, a technique is resorted to which includes making what is known as a Gothic arch tracing. This is accomplished by first applying to the casts of the alvealor ridges, so-called stabilized baseplates, hereinafter simply referred to as "baseplates," which are formed from a complex of wax-like substances capable of being softened to shape them and then hardened to retain a given shape. Such baseplates are shaped directly upon the casts of the alveolar ridges. When such shaped baseplates have been completed for the upper and lower dentures, any of a number of different types of Gothic arch tracing devices may be utilized. Some are of the intra-oral type while others are of the extra-oral type. Regardless of which type is used, devices of this type comprise a small plate or registering table which is affixed to one of the baseplates and a tracing pin or marker is affixed to the other baseplate.

By forming upon the registering table a suitable layer of ink or other compound capable of having a tracing mark inscribed thereon, the baseplates are placed in the patient's mouth so as to rest in natural position upon the patient's alveolar ridges. The patient then makes normal lateral excursions or movements of his mandible in both principal sidewise directions, as well as forwardly and rearwardly in protrusive and retrusive directions. This results in a V-shaped pattern or tracing being formed on said recording layer upon said registering plate by the pin or stylus referred to. While the Gothic arch tracings of no two patients are exactly alike, the differences mainly are due to the lengths of the alveolar ridges of different patients. A different angular tracing will be made by a patient having a long or wide jaw, as compared with a patient having a short or narrow jaw.

From the foregoing, it can be seen that the Gothic arch tracing can be the key, for example, between the patient and the articulator, after the patient's movements make the tracing; between the dentist or dental technician, whoever fabricates the wax pattern with the teeth attached thereto; to insure proper positioning of the casts and baseplates upon the upper and lower bow members of an articulator. That is, if the casts and baseplates are properly located upon said bow members, when said members are relatively moved, they will simulate the relative movement between the alveolar ridges of the specific patient for whom the restorative appliance is being made. Similarly, when the baseplates with the Gothic arch tracing and pin or stylus respectively attached thereto are placed upon said casts and relatively moved by the articulator bow members, the stylus will follow the tracing perfectly. The problem heretofore has been, how the casts are to be properly and accurately located or oriented upon said bow members of the articulators.

Generally speaking, the proper orientation of dental casts with respect to an articulator is one phase of prosthetic dentistry that is minimized or is not observed as carefully as it should be in order to insure, as closely as possible, ideal articulation or interdigitation of artificial teeth in restorative dental appliances. One reason might be that existing apparatus and methods to accomplish this are complex and difficult, as well as time consuming and awkward to practice. Hence, it is the principal object of the present invention to provide a fixture, for use with a Gothic arch tracing made by an intra-oral tracing device, which will greatly simplify the amount of skill, knowledge and effort previously required with known and presently used instruments to properly locate the casts upon the bows of an articulator at the precise, required locations thereon such that when relative movement is effected between the upper and lower bows of an articulator, said movement will simulate as closely as possible the identical movement of the alveolar ridges of the specific patient for whom a restorative dental device is being made.

It is another object of the present invention to provide an extremely simple fixture which quickly can be located within and supported by a dental articulator, said fixture having thereon a series of typical and progressively varying angular patterns simulating typical Gothic arch tracings made in accordance with different positions of a lower ridge cast when disposed at said different positions upon the lower member of an articulator, whereby it is only necessary to orient or match up an actual Gothic arch tracing with respect to one of said series of tracings upon said fixture, and the operator then will know that the cast is at the correct position with respect to the lower member of the articulator for the specific patient whose actual tracing was used.

A further object of the invention is to provide such fixture with a transparent member upon which said series of typical, gradually varying angular patterns of tracings are inscribed, whereby an actual Gothic arch tracing readily may be moved with respect to said transparent member to quickly achieve exact matching of the angularly related sides of the actual tracing with the most closely similar tracing in the series thereon upon said fixture.

Still another object of the invention is to provide the aforementioned fixture with means by which the baseplate and actual Gothic arch tracing carried thereby, as well as the lower cast mounted thereon may be temporarily fixed with respect to the fixture so as to facilitate the accurate locating and connection of the cast to the lower member of the articulator.

Details of the foregoing objects as well as details of the invention, and other objects thereof, are set forth in the following specification and illustrated in the accompanying drawings comprising a part thereof.

The preferred embodiment of the fixture comprising the present invention is illustrated in the accompanying drawings. It primarily comprises a greatly simplified device to be substituted for the presently used, highly complex devices known as face bows which, in general, are of such complexity that only the most fastidious dentists employ the same. This is due not only to the complexity of operation but also because of the extra time and tediousness required to transport the same from a dentist to a dental laboratory in order that the technician might use it in locating a specific stone cast in a particular articulator.

One previous attempt to circumvent the use of face bows and other complex techniques resulted in the development of an instrument known as a Kinematic Relator which comprises the subject matter of U.S. Patent No. 2,656,603, in the name of J. E. Brassie, dated Oct. 27, 1953. Said Relator is intended to be used in conjunction with an actual Gothic arch tracer but a number of adjustments of relatively movable parts of the instrument are required incident to orienting the same with respect to an actual tracing affixed to baseplates so as to relate the cast and attached baseplate in accurate position in an articulator. Accordingly, such Relator has not been highly accepted by the dental profession, notwithstanding the continuing need for a suitable instrument to insure the accurate setting of cusp-type artificial teeth on the baseplates so that the cusps, for example, of the upper and lower teeth will properly mesh and otherwise interdigitate with one another and thus function in harmony with the movements of the patient's alveolar ridges. Accurate mounting of the casts and baseplates in a mechanical articulator should establish them in a relationship to the rotational centers of the articulator so as, ideally, to be identical to the relationship that the baseplates will have to the rotational centers of a patient's mandible when the baseplates and, ultimately, the dentures have been inserted in the patient's mouth. The fixture comprising the present invention readily facilitates such accurate mounting of the case and baseplate in a mechanical articulator.

Figure 1:
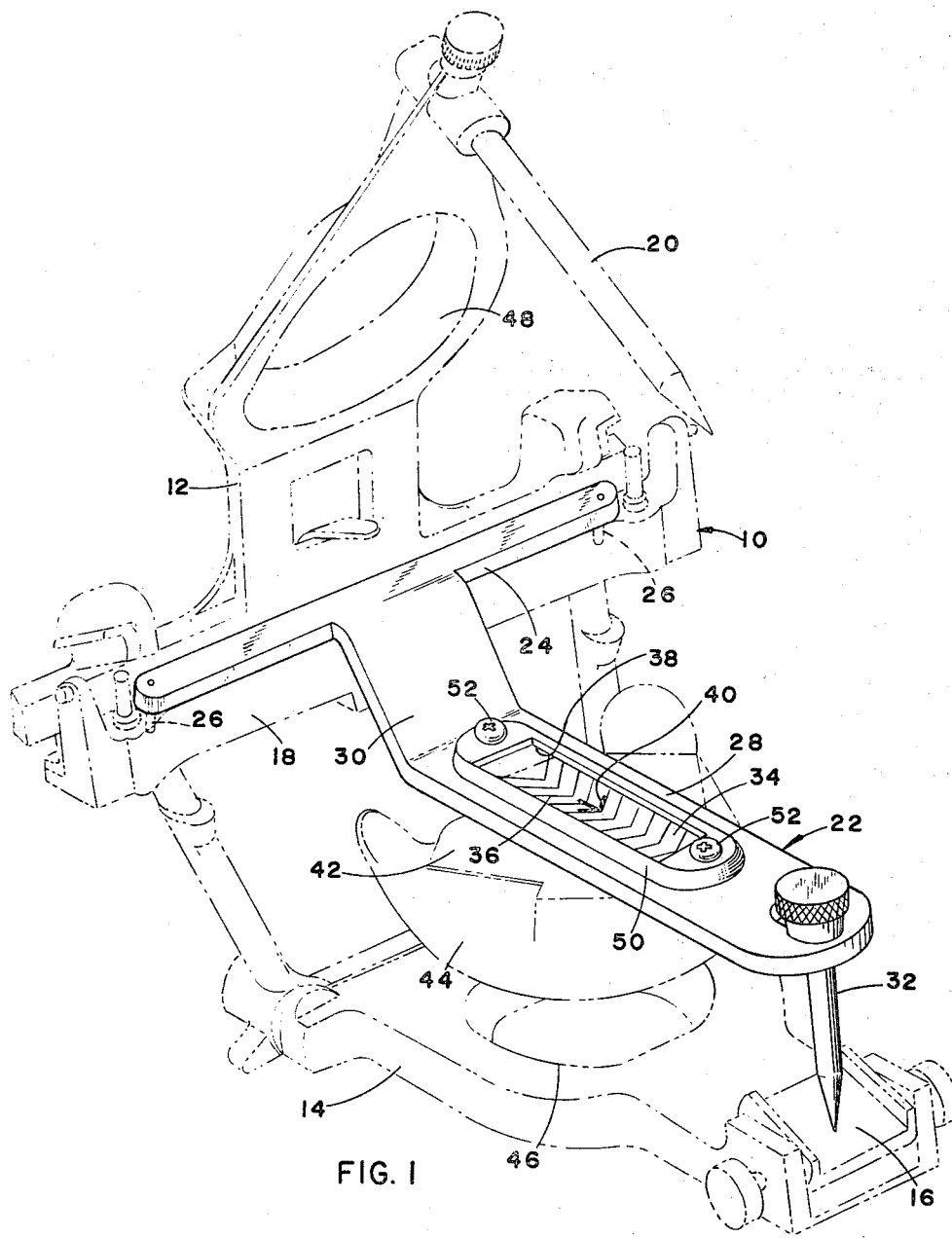
FIG. 1 is a perspective view of a typical articulator, illustrated in phantom and shown with the upper bow member in open position, with the fixture comprising the present invention shown in full lines and disposed in operative position with respect to the lower bow member of the articulator.

Referring to the drawings and particularly FIG. 1, an articulator 10 is shown therein having an upper bow member 12 which is pivotally mounted at its rear end with respect to the rear upper portion of a lower bow member 14. The lower bow member has an incisal table 16 at the forward portion thereof which is angularly adjustable relative to a vertical plane and also a horizontal back frame 18 which is rigid with respect to the lower bow member 14. It will be understood that the upper bow member 12 additionally is movable laterally at its forward end with respect to the lower bow member especially to effect motions closely resembling those of the human mandible with respect to the upper maxilla. However, in regard to transferring these motions to the articulator, for ease of operation, the upper bow member 12 moves with respect to the lower bow member 14, thereby being in reverse to the actual function of the human mouth, but nevertheless effecting appropriate relative movement between said bow members.

The present dscription will not include details of the various adjustable standard type pivot mechanisms between the upper bow member 12 and the back frame 18 of the lower member 14, but it is to be understood that such angular adjustments of movement are contemplated in the typical articulator 10 illustrated in FIG. 1. Also, an incisal guide pin 20 is adjustably carried by the forward end of upper member 12 for engagement with the adjustable incisal table 16 in accordance with customary articulator operations. The present description primarily concerns the mounting and operation of the fixture 22 with respect to the lower bow member 14 and primarily functions while the upper bow member 12 is disposed in raised position as shown in phantom in FIG. 1.

Figure 2:
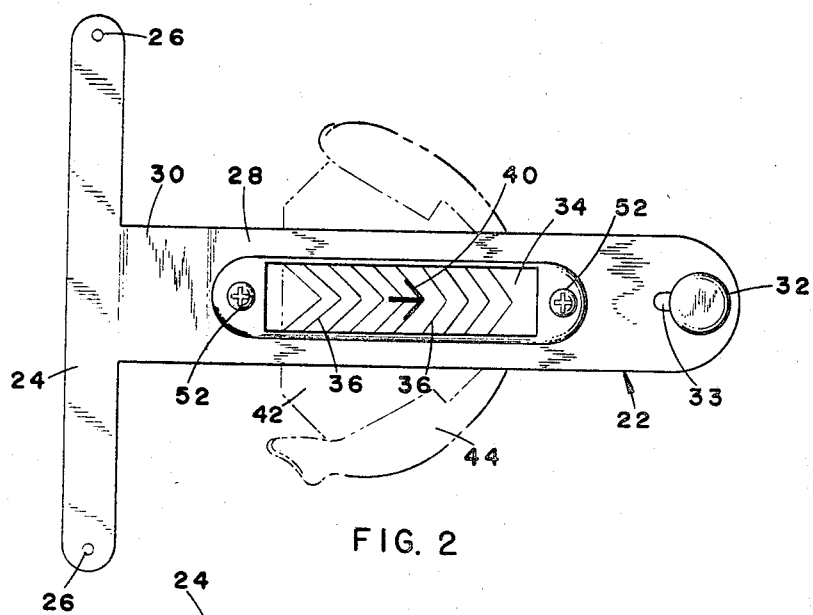
FIG. 2 is a top plan view of the fixture shown in FIG. 1 and also including, in phantom, a typical lower dental cast having a Gothic arch tracing affixed thereto and illustrated in process of being oriented with respect to a typical tracing simulation on the fixture.
Figure 3:
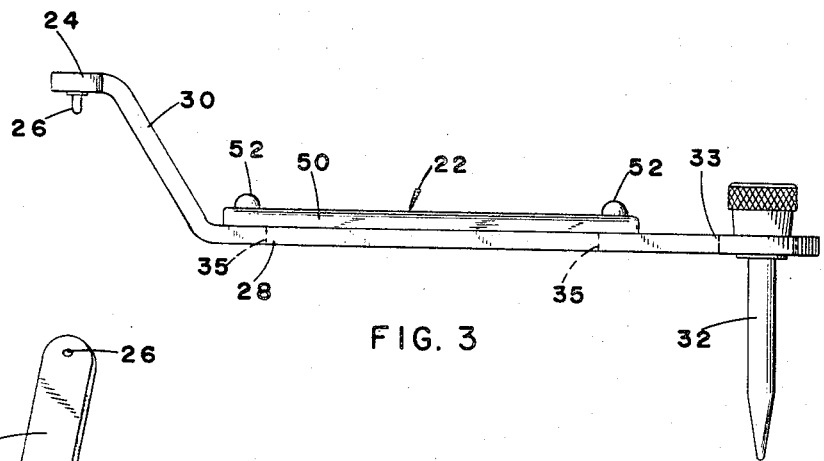
FIG. 3 is a side view of the fixture shown in FIG. 2.

The fixture 22, in its preferred form, is substantially T-shaped in plan view, as readily can be seen from FIG. 2. It comprises a rear transverse head member 24 which, in the opposite ends thereof, has positioning means such as pins 26 projecting downwardly therefrom for reception within complementary sockets or holes formed in the back frame 18 of the articulator. If desired, it is to be understood that the pins 26 and the sockets in back frame 18 which receive the same may be reversed if manufacturing operations or other circumstances dictate.

The fixture 22 also comprises a stem member 28 which has a downwardly and forwardly extending offset portion 30 therein immediately adjacent the head member 24 of the fixture. This is for purposes of establishing the main portion of the stem member 28 suitably such as substantially parallel, relative to the general plane of the lower bow member 14. Final positioning of the fixture 22 with respect to member 14 is achieved by means of a forward vertical pin 32 which is supported at its upper end within slot 33 formed in the forward end of stem member 28 so as to have limited longitudinal adjustability relative thereto. The lower end of pin 32 preferably is tapered so as to resemble a stylus which engages the incisal table 16 after the latter has been angularly adjusted in accordance with the requirements of the restorative appliance being fabricated for any particular patient. By suitably positioning the pin 32 longitudinally in slot 33, corresponding movement of the lower end upon incisal table 16 will establish the forward end of fixture 22, as required, vertically relative to lower bow member 14.

From the foregoing, and especially from FIG. 2, it will be seen that the general outline of the extremities of the fixture 22 is triangular, whereby the fixture has a 3-point support so as to detachably fix it with respect to lower bow member 14. Accordingly, accurate positioning of the fixture with respect to the lower bow member 14 is readily and quickly accomplished with accuracy.

Figure 4:
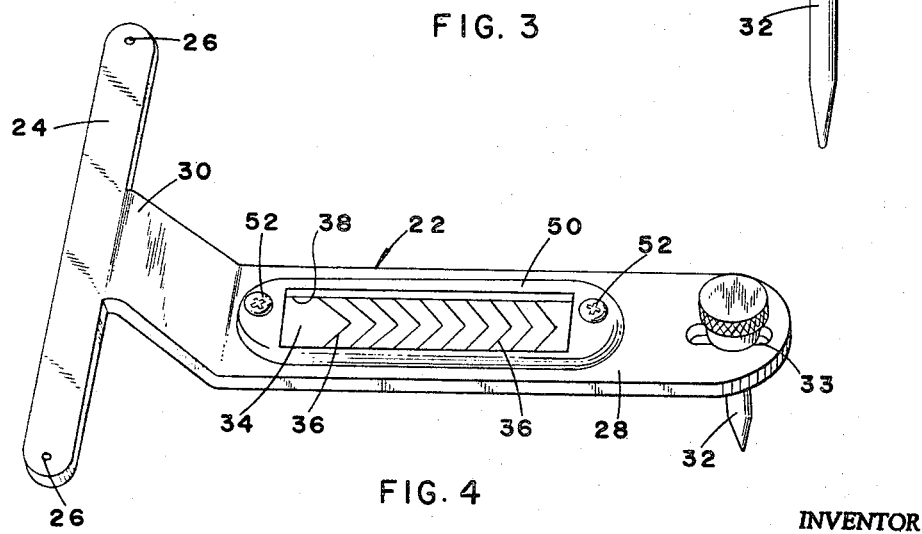
FIG. 4 is a perspective view of the fixture shown in FIGS. 2 and 3.

The fixture 22 also includes comparing means which, in accordance with the principles of the present invention, preferably comprises a transparent elongated block or plate 34 having molded, impressed or otherwise inscribed thereon a series of longitudinally spaced, typical Gothic arch tracings 36 which are somewhat arranged in nested, though evenly spaced, relationship as readily can be seen from FIGS. 1, 2 and 4. The angles between the diverging lines of the tracings progressively differ in angularity, becoming more acute from the forward to the rear end of said row of tracing and respectively corresponding to actual Gothic arch tracings which would be made by the natural movement of the patient's mandible similarly located relative to the pivot means of the articulator.

The transparent plate 34 which has the row of Gothic arch tracings 36 formed thereon has a block-like elongated projection depending therefrom which is received within a complementary longitudinally extending opening or slot 38 formed in the stem member 28. Accordingly, the transparent plate 34 is superimposed above stem member 28 but the tracings 36 are formed preferably on the lower surface of said projection which is preferably substantially flush with the lower surface of stem member 28 of fixture 22. Thus plate 34 serves as a window through which may be observed for comparison an actual Gothic arch tracing 40 which has been inscribed upon a registering table or plate 42 that has been formed by a known type of intra-oral tracing device and has been affixed by wax or otherwise to a baseplate 44.

The foregoing arrangement permits movement of the baseplate 44 and the registering plate 42 affixed thereto with the actual Gothic arch tracing 40 thereon in direct contact with and along the row of typical tracing 36 on member 34 until it can be matched with both the angularity and position of one of the typical tracings 36 of said row thereof. When such matching and registering of the tracing 40 has been accomplished with respect to one particular tracing 36 of the entire row thereof, the operator will know that the baseplate 44 is in proper registering position with respect to the lower bow member 14 for the particular restorative appliance being prepared for a specific patient. Even if the tracing 40 on the registering plate 42 may be eccentric relative to a median dividing line on said plate as a result of uneven condyles, this will be accounted for by aligning tracing 40 exactly with matching tracing 36.

It will be understood that the baseplate 44, which is made of a wax-like substance, already has been shaped to conform to the lower cast of the specific patient's alveolar ridges for which the restorative appliance is being made. Such cast is omitted from FIG. 1 for purposes of simplifying the illustration. However, when the aforementioned matching or registry of actual tracing 40 has been made with a selected tracing 36 of the comparing means 34, one suitable technique which then may be used is to lightly connect the registering plate 42 with the stem 28 of fixture 22 so as to temporarily maintain the aforementioned registration of Gothic arch tracings 40 and 36. The cast of the patient's lower alveolar ridge than may be positioned within the shaped baseplate 44, followed by the addition of soft plaster between the base portion of the cast and the lower bow member 14.

It will be seen from FIG. 1 that the lower bow member 14 has an opening 46 therein which receives the aforementioned soft plaster. Upon hardening, the previously made cast of the patient's lower alveolar ridge then will be fixed with respect to lower bow member 14 of the articulator. The fixed positioning of the cast usually is assured by means of a transverse pin, not shown, which extends through the lower part of the mount for the cast and the side walls of the opening 46. Following this, the fixture 22 may be detached from its light connection to the registering plate 42 and also be removed entirely from the articulator to permit the connection of the upper cast to the upper bow member 12. The latter, as in the lower bow member, has an opening 48 therein for the reception of soft "stone" by which the upper cast is attached to the upper bow member 12 after suitable vertical spacing, in accordance with known techniques, has been achieved between the upper and lower cast and the baseplates conformed thereto.

It will be understood that in some circumstances, the cast utilized will be that of a patient's upper or lower alveolar ridge, opposed by natural teeth, such as under circumstances where, for example, only a single restorative appliance is being fabricated.

The formation of the row of Gothic arch tracings 36 upon the lower surface of the block-like projection of comparing means 34 which preferably is flush with the plane of the lower surface of stem member 28 insures direct and accurate comparing and registration of the actual Gothic arch tracing 40 with a selected tracing 36. To secure the comparing means 34 to stem member 28, said means is provided with suitable mounting portions 50 which overlap the upper surface of stem member 28 around the opening 38. Mounting portions 50 are secured thereto in any suitable manner, such as by screws 52.

From the foregoing, it will be seen that the present invention provides means by which the baseplate 44 for a lower denture, for example, may be mounted accurately within a dental articulator 10 in such manner that when the model of the patient's upper alveolar ridge and teeth or baseplate for an upper denture is properly oriented with respect to the lower baseplate 44, the upper and lower bow members 12 and 14 of the articulator may be moved relative to each other to simulate the actual relative movement of the upper and lower alveolar ridges of the particular patient for which the restorative dental appliance is being made. That is, the casts and baseplates in the articulator may be moved in relation to the rotational centers of the articulator substantially identically to the relationship that the baseplates will have to the rotational centers of the patient's mandible when said baseplates and dentures are mounted on the patient's alveolar ridges.

While the invention has been described and illustrated in its several preferred embodiments, it should be understood that the invention is not to be limited to the precise details herein illustrated and described since the same may be carried out in other ways falling within the scope of the invention as claimed.

I claim:
1. A fixture for use in positioning stabilized baseplates and casts in a mechanical articulator having relatively movable upper and lower bow members and an incisal table and a back frame on said lower bow member, said fixture comprising in combination a relatively rigid member, means thereon engageable with an articulator to position the fixture in fixed relation to said articulator, and comparing means fixed relative to said rigid member and positionable above the lower bow member of said articulator and also above a cast and stabilized baseplate for a lower denture having a Gothic arch tracing affixed thereto, said comparing means having a series of spaced typical Gothic arch tracings thereon progressively differing in angularity for matching of the Gothic arch tracing on said stabilized baseplate with one of said series of tracings to establish the preferred operative position of said lower cast and baseplate relative to said articulator.

2. The fixture according to claim 1 in which said means thereon to engage said articulator comprise interfitting pin and socket means on said fixture and articulator and a pin on the forward part of said fixture engageable with the incisal table of said articulator.

3. The fixture according to claim 2 in which comparing means is transparent and said series of Gothic arch tracings are visibly inscribed thereon, whereby the tracing on said lower stabilized baseplate may be viewed therethrough and thereby visibly compared and matched with one of said tracings on said comparing means.

4. The fixture according to claim 2 in which said rigid member of said articulator has extremities substantially defining a triangle and said means on said fixture which engage said articulator being located substantially at said extremities.

5. The fixture according to claim 4 in which said rigid member of said articulator is substantially T-shaped, the transverse head of the same being positionable adjacent and parallel to the back frame of said articulator and the stem of said member extending forwardly from said transverse head and having said comparing means thereon.

6. The fixture according to claim 5 in which said comparing means is transparent and said series of Gothic arch tracings are visibly inscribed thereon.

7. The fixture according to claim 6 in which said stem of said member supports said transparent comparing means with said series of tracings being in a row extending longitudinally of said stem.

8. The fixture according to claim 5 in which said stem of said T-shaped fixture has an opening therein extending longitudinally thereof and said comparing means is a transparent member aligned with said opening and having said series of Gothic arch tracings inscribed thereon and visible through said opening.

9. The fixture according to claim 8 in which the opposite ends of said transverse head have pins projecting downward therefrom for reception in complementary socket holes in the back frame of said articulator.

References Cited
UNITED STATES PATENTS 2,656,603  10/1953  Brassie _____ 32—32
3,059,335  10/1962  Reynolds _____ 32—19

LOUIS G. MANCENE, *Primary Examiner.*

C. R. WENTZEL, *Assistant Examiner.*